(12) United States Patent
Trichy et al.

(10) Patent No.: US 10,917,015 B2
(45) Date of Patent: Feb. 9, 2021

(54) MULTIPHASE CONVERTER SYSTEM AND CONTROL METHOD

(71) Applicant: Active-Semi (BVI) Inc., Allen, TX (US)

(72) Inventors: Narasimhan Trichy, Plano, TX (US); Masashi Nogawa, Sachse, TX (US)

(73) Assignee: Active-Semi (BVI) Inc., Allen, TX (US)

( * ) Notice: Subject to any disclaimer, the term of this patent is extended or adjusted under 35 U.S.C. 154(b) by 11 days.

(21) Appl. No.: 16/117,014

(22) Filed: Aug. 30, 2018

(65) Prior Publication Data

US 2019/0074770 A1    Mar. 7, 2019

Related U.S. Application Data

(60) Provisional application No. 62/552,459, filed on Aug. 31, 2017.

(51) Int. Cl.
| | | |
|---|---|---|
| *H02M 3/158* | (2006.01) | |
| *H02M 1/14* | (2006.01) | |
| *H02M 1/44* | (2007.01) | |
| *H02M 1/42* | (2007.01) | |
| *H02M 1/00* | (2006.01) | |

(52) U.S. Cl.
CPC ........... *H02M 3/1584* (2013.01); *H02M 1/14* (2013.01); *H02M 1/42* (2013.01); *H02M 1/44* (2013.01); *H02M 2001/0025* (2013.01); *H02M 2001/0054* (2013.01); *H02M 2003/1586* (2013.01)

(58) Field of Classification Search
CPC ........ H02M 3/1584; H02M 1/44; H02M 1/14; H02M 1/42; H02M 2001/0054; H02M 2001/0025; H02M 2003/1586

USPC ......................................................... 323/271
See application file for complete search history.

(56) References Cited

U.S. PATENT DOCUMENTS

| | | |
|---|---|---|
| 5,363,366 A | 11/1994 | Widom, Jr. et al. |
| 2007/0132508 A1 | 6/2007 | Rice |
| 2011/0140679 A1 | 6/2011 | Xu et al. |
| 2012/0014148 A1 | 1/2012 | Li et al. |
| 2012/0091977 A1 | 4/2012 | Carroll et al. |
| 2013/0148397 A1 | 6/2013 | Schroeder et al. |
| 2014/0125148 A1 | 5/2014 | Kraus, Jr. |

(Continued)

OTHER PUBLICATIONS

Received STIC search report from EIC 2800 searcher Benjamin Martin dated Jan. 23, 2019 for claims 10 and 16. (Year: 2019).*

(Continued)

*Primary Examiner* — Shawki S Ismail
*Assistant Examiner* — Htet Z Kyaw
(74) *Attorney, Agent, or Firm* — Withrow & Terranova, P.L.L.C.

(57) ABSTRACT

A multiphase operation control method comprises configuring a plurality of power phases of a power converter to operate in an interleaved manner by passing a token sequentially among the plurality of power phases, turning on a first power phase after the first power phase possesses the token and receives a trigger signal from a control circuit of the first power phase, passing the token to a second power phase after the first power phase finishes, passing the token sequentially until a last power phase of the plurality of power phases possesses the token and forwarding the token to the first power phase after the last power phase finishes.

20 Claims, 7 Drawing Sheets

(56) References Cited

U.S. PATENT DOCUMENTS

2015/0280556 A1    10/2015   Bari et al.
2017/0149908 A1     5/2017   Van Amstel et al.

OTHER PUBLICATIONS

International Search Report and Written Opinion for International Patent Application No. PCT/US2018/048679, dated Nov. 19, 2018, 13 pages.
International Preliminary Report on Patentability for International Patent Application No. PCT/US2018/048679, dated Mar. 12, 2020, 12 pages.

* cited by examiner

MULTIPHASE CONVERTER SYSTEM AND CONTROL METHOD

CROSS REFERENCE TO RELATED APPLICATIONS

This application is related to, and claims priority to, U.S. Provisional Application No. 62/552,459, titled, "Multiphase Converter System and Control Method" filed on Aug. 31, 2017, which is herein incorporated by reference.

TECHNICAL FIELD

The present invention relates to a control scheme for a multiphase converter, and, in particular embodiments, to an interleaved operation control scheme for a multiphase converter.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified tolerance even when the current drawn by the electronic device may vary over a wide range. In order to maintain the voltage within the specified tolerance, a power converter (e.g., a switching dc/dc converter) coupled to the electronic device provides very fast transient responses, while keeping a stable output voltage under various load transients.

Hysteretic-based power converter control schemes such as the constant on-time scheme can enable power converters to provide fast transient responses. A buck converter employing the constant on-time control scheme does not require an error amplifier. In fact, a simple constant on-time circuit may only comprise a feedback comparator and an on-timer. In operation, the feedback circuit of the power converter (e.g., buck converter) directly compares a feedback signal including both dc and ripple voltages with an internal reference. When the feedback signal falls below the internal reference, the high-side switch of the power converter is turned on and remains on for the on-timer duration. As a result of turning on the high side switch, the inductor current of the power converter rises. The high-side switch of the power converter turns off when the on-timer expires, and does not turn on until the feedback signal falls below the internal reference again. In sum, when the constant on-time control scheme is employed in a power converter, the on-time of the high-side switch of the power converter is terminated by the on-timer. The off-time of the high-side switch of the power converter is terminated by the feedback comparator.

The power converters employing the constant on-time control scheme are simple to design. However, the constant on-time control scheme has an unwanted behavior. For example, an interleaved operation of a traditional multiphase converter can be easily achieved by phase shifting the clock signals. A multiphase converter employing the constant on-time control scheme is not synchronized to a clock signal. As such, it is hard to configure a constant on-time based multiphase converter to operate in an interleaved manner.

It would be desirable to provide a control method for configuring a constant on-time multiphase converter to operate in an interleaved manner.

SUMMARY

In particular embodiments, a control scheme may configure a multiphase converter employing a constant on-time control scheme to operate in an interleaved manner.

In accordance with an embodiment, a method comprises providing a power converter comprising a plurality of power phases, wherein each power phase comprises a power stage and a corresponding control circuit, outputs of the plurality of power phases are connected together and at least one power stage is controlled by a constant-on time control scheme and configuring the plurality of power phases to operate in an interleaved manner by passing a token sequentially among the plurality of power phases, wherein the token represents an enable function for allowing a high-side switch of a power phase possessing the token to be turned on.

In accordance with another embodiment, a method comprises configuring a plurality of power phases of a power converter to operate in an interleaved manner by passing a token sequentially among the plurality of power phases, turning on a first power phase after the first power phase possesses the token and receives a trigger signal from a control circuit of the first power phase, passing the token to a second power phase after the first power phase finishes, passing the token sequentially until a last power phase of the plurality of power phases possesses the token and forwarding the token to the first power phase after the last power phase finishes.

In accordance with yet another embodiment, a system comprises a plurality of power phases connected between an input power source and an output terminal, wherein each power phase comprises a constant on-time power converter and a controller configured to generate gate drive signals for the plurality of power phases, wherein the plurality of power phases are configured to operate in an interleaved manner by passing a token sequentially among the plurality of power phases, wherein the token is generated by the controller and the token represents an enable function for allowing a power phase possessing the token to be turned on.

An advantage of a preferred embodiment of the present disclosure is improving a constant on-time power converter's performance through configuring a constant on-time multiphase converter to operate in an interleaved manner.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a control method for achieving an interleaved operation for a multiphase converter employing a constant on-time control scheme. The invention may also be applied, however, to a variety of power converters. Hereinafter, various embodiments will be explained in detail with reference to the accompanying drawings.

Figure 1A:
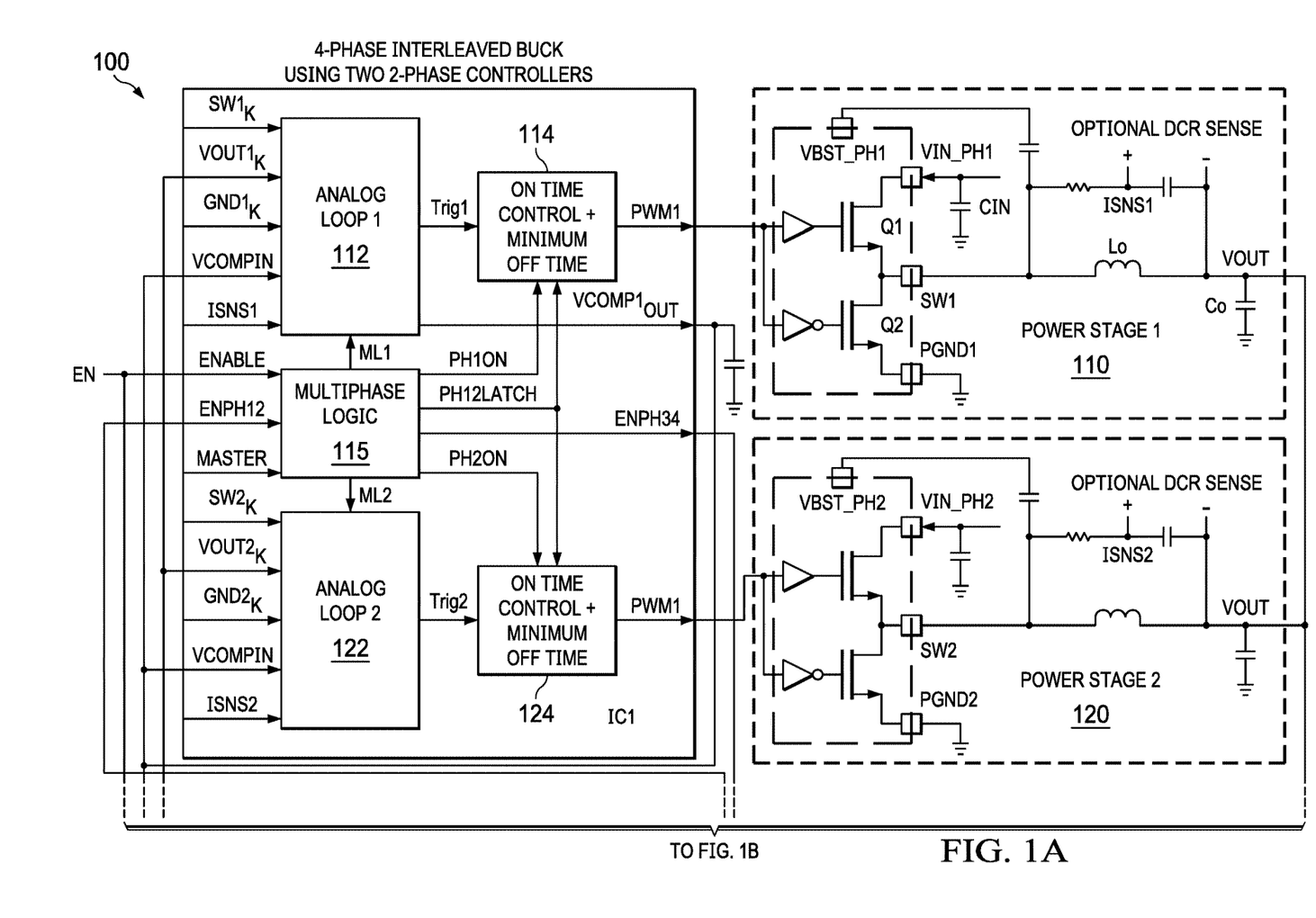
FIG. 1 illustrates a schematic diagram of a first implementation of a four-phase converter employing a constant on-time control scheme in accordance with various embodiments of the present disclosure and FIG. 1 includes FIG. 1A and FIG. 1B, which are collectively referred to as FIG. 1.
Figure 1B:
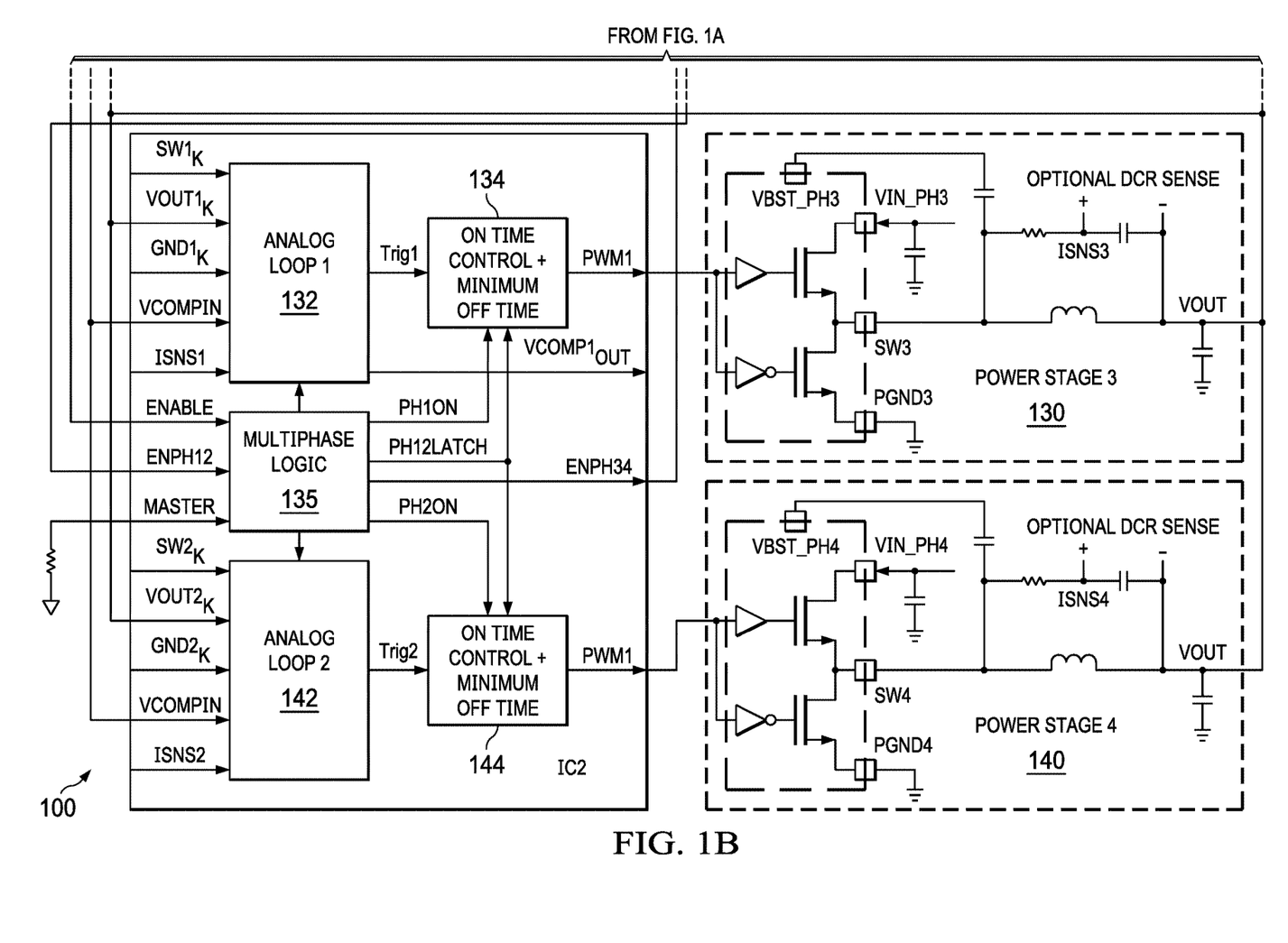

FIG. 1 illustrates a schematic diagram of a first implementation of a four-phase converter employing a constant on-time control scheme in accordance with various embodiments of the present disclosure. FIG. 1 includes FIG. 1A and FIG. 1B. Throughout the description, FIG. 1A and FIG. 1B are collectively referred to as FIG. 1. The four-phase converter 100 comprises four phases coupled between an input power source VIN and an output VOUT. Each phase comprises a power stage and its corresponding control circuit.

In order to have a low resistance connection between the input power source VIN and the power stages, the output of the input power source VIN is divided into four connection terminals VIN_PH1, VIN_PH2, VIN_PH3 and VIN_PH4 as shown in FIG. 1. These four connection terminals are connected to the inputs of the four phases respectively.

As shown in FIG. 1, there may be four power stages, namely a first power stage 110, a second power stage 120, a third power stage 130 and a fourth power stage 140. The four power stages are connected in parallel between the input power source VIN and the output VOUT as shown in FIG. 1. In particular, the inputs of the four power stages are connected together through the connection terminals and further connected to the input power source VIN. The outputs of the four power stages are connected together and further connected to a load and/or a downstream power converter.

In some embodiments, each power stage is a step-down power converter (also known as a buck converter). As shown in FIG. 1, the four power stages 110, 120, 130 and 140 have a same power topology. In order to avoid unnecessary repetition, only the power topology of the first power stage 110 is discussed in detail below.

The first power stage 110 includes a first switch Q1, a second switch Q2, an inductor Lo and an output capacitor Co. As shown in FIG. 1, the first switch Q1 and the second switch Q2 are connected in series between the connection terminal VIN_PH1 and ground PGND1. The inductor Lo is connected between the common node of the first switch Q1 and the second switch Q2, and the output capacitor Co. Throughout the description, the common node of the first switch Q1 and the second switch Q2 is alternatively referred to as a switching node SW1. The first power stage 110 further comprises a bootstrap capacitor connected between the switching node SW1 and a bootstrap node VBST_PH1 as shown in FIG. 1. The function of the bootstrap capacitor is well known, and hence is not discussed herein.

In some embodiments, the first switch Q1 and the second switch Q2 are implemented as n-type transistors as shown in FIG. 1. The gate of the first switch Q1 and the gate of the second switch Q2 are connected together through a buffer and an inverter and further coupled to the output of the control circuit.

Depending on different applications and design needs, a current sense circuit may be employed to further improve the performance of the four-phase converter 100. As shown in FIG. 1, the current sense circuit of the first power stage 110 is connected in parallel with the inductor Lo. As shown in FIG. 1, a first current sense circuit ISNS1 includes a resistor and a capacitor connected in series between the switching node SW1 and the output terminal VOUT. The first current sense circuit is also known as a direct current resistance (DCR) sensing circuit, which uses the parasitic resistance of the inductor winding to measure the current flowing through the inductor. As shown in FIG. 1, the current sense signal is detected across the capacitor. The operation principle of the DCR sensing circuit is well known, and hence is discussed herein to avoid repetition.

The four-phase converter 100 further comprises two controllers, namely a first controller IC1 and a second controller IC2. As shown in FIG. 1, the four power stages are controlled by the PWM signals generated by the controllers IC1 and IC2. In particular, a first PWM signal PWM1 from the first controller IC1 is employed to control the operation of the first power stage 110. A second PWM signal PWM2 form the first controller IC1 is employed to control the operation of the second power stage 120. Likewise, a first PWM signal PWM1 from the second controller IC2 is employed to control the operation of the third power stage 130. A second PWM signal PWM2 form the second controller IC2 is employed to control the operation of the four power stage 140.

It should be noted that FIG. 1 illustrates two power stages controlled by a controller. This diagram is merely an example, which should not unduly limit the scope of the claims. One of ordinary skill in the art would recognize many variations, alternatives, and modifications. For example, a controller could control any number of power stages depending different applications and design needs.

The first controller IC1 and the second controller IC2 include the same function units. For simplicity, only the structure of the first controller IC1 is discussed in detail herein. As shown in FIG. 1, the first controller IC1 includes a first feedback loop unit 112, a second feedback loop unit 122, a first on-time and minimum off-time control unit 114, a second on-time and minimum off-time control unit 124 and a multiphase logic unit 115.

In some embodiments, the second feedback loop unit 122 has a same structure as the first feedback loop unit 112. The second on-time and minimum off-time control unit 124 has a same structure as the first on-time and minimum off-time control unit 114. For simplicity, only the structures of the first feedback loop unit 112 and the first on-time and minimum off-time control unit 114 are discussed in detail herein.

The first feedback loop unit 112 and the first on-time and minimum off-time control unit 114 are connected in cascade as shown in FIG. 1. The first feedback loop unit 112 is configured to receive a plurality of control signals including a switching node voltage $SW1_K$, an output voltage $VOUT1_K$, a first ground voltage $GND1_K$, a feedback loop output signal VCOMPIN and a current sense signal ISNS1.

In some embodiments, $SW1_K$ is measured from the common node of Q1 and Q2 of the first power stage 110. $VOUT1_K$ is the voltage across the output capacitor of the first power stage 110. $GND1_K$ is measured from the power ground plane of the first power stage 110. The feedback loop output signal VCOMPIN is an output signal of a comparator of the first feedback loop unit 112. The current sense signal ISNS1 is the voltage across the capacitor of the first current sense circuit of the first power stage 110.

The first feedback loop unit 112 also receives a multiphase operation control signal ML1 from the multiphase logic unit 115. The multiphase logic unit 115 also generates a multiphase operation control signal ML2 for the second feedback loop unit 122 as shown in FIG. 1.

The first feedback loop unit 112 is used to monitor the output voltage and turn on the high-side switch Q1 when the detected output voltage is below a predetermined reference. In particular, the first feedback loop unit 112 generates a trigger signal Trig1 and feeds this trigger signal to the first on-time and minimum off-time control unit 114. The first on-time and minimum off-time control unit 114 generates the PWM signal PWM1 based on the trigger signal Trig1 and a token from the multiphase logic unit 115. The first on-time and minimum off-time control unit 114 will not generate the PWM signal to turn on the high-side switch Q1 unless the first on-time and minimum off-time control unit 114 receives the trigger signal Trig1 and possesses the token. The token transferring control scheme among different phases will be described in detail with respect to the multiphase logic unit 115.

After the first on-time and minimum off-time control unit 114 possesses the token and receives the trigger signal Trig1, the first on-time and minimum off-time control unit 114 generates a turn-on signal to turn on the high-side switch Q1. After the high-side switch Q1 has been turned on, the turn-on time of the high-side switch Q1 is determined by an on-timer of the first on-time and minimum off-time control unit 114.

In some embodiments, the first feedback loop unit 112 comprises a voltage divider coupled to the output voltage VOUT, an error amplifier, a compensation network, a predetermined reference and a comparator. In alternative embodiments, the first feedback loop unit 112 may comprises a ramp generator for further improving the performance. Furthermore, in order to reduce the cost of the control circuit, the first feedback loop unit 112 may not include an error amplifier and the associated compensation network. The operation principle of a feedback loop unit of a converter employing a constant on-time control scheme is well known, and hence is not discussed in detail herein.

The first on-time and minimum off-time control unit 114 comprises an on-time control apparatus and a minimum off-time control apparatus. The on-time control apparatus may comprises a current source, a capacitor, a switch, a predetermined reference and a comparator. The current source is used to charge the capacitor. The comparator compares the voltage across the current source with the predetermined reference. The output of the comparator is used to trigger a turn-off of the high-side switch Q1. The on-time can be adjusted by either adjusting the current from the current source or adjusting the predetermined reference. The operation principle of the on-time control apparatus of a converter employing a constant on-time control scheme is well known, and hence is not discussed in detail herein.

The minimum off-time control apparatus is employed to control the off-time of the high-side switch Q1. The minimum off-time of the high-side switch Q1 is determined by a variety factors such as the input voltage, the output voltage, the number of phases. The minimum off-time control may prevent the inductor from being saturated during a fast transient of the load. In addition, the minimum off-time control may help reduce the output voltage/current ripple of the multiphase power converter.

In operation, the multiphase operation control signal coordinates with other multiphase operation control signals applied to the other power stages such that the leading edges of the PWM signals applied to the high-side switches of the four power stages occur at staggered intervals to achieve an interleaved operation. Such an interleaved operation helps to achieve high output power with minimized electromagnetic interference (EMI).

The first on-time and minimum off-time control unit 114 is configured to receive an output signal Trig1 from the first feedback loop unit 112. In addition, the first on-time and minimum off-time control unit 114 also receives two signals PH1ON and PH12LATCH from the multiphase logic unit 115. Based upon the received signals, the first on-time and minimum off-time control unit 114 generates the first PWM signal PWM1.

In order to achieve an interleaved operation of the four-phase converter 100, the four power stages shown in FIG. 1 are turned on in a round-robin fashion. In other words, only one phase is allowed to be turned on at a time. Such a round-robin fashion results in an interleaved operation. The multiphase logic unit 115 of the first controller IC1 and the multiphase logic unit 135 of the second controller IC2 are used to control the four phases so as to achieve the interleaved operation.

The signals used to communicate between the phases are MASTER, ENPH12, ENPH34 and $VCOMP1_{OUT}$. The MASTER signal is used to configure each controller IC to be a master or a slave. If the master pin of a controller IC is tied to ground, this controller IC behaves as a slave. On the other hand, if the MASTER signal of a controller IC is left floating or tied to high, this controller IC behaves like a master.

As shown in FIG. 1, the MASTER pin of the first controller IC1 is left floating. The MASTER pin of the second controller IC2 is connected to ground through a resistor. As a result, the first controller IC1 functions as a master. The second controller IC2 functions as a slave. In operation, the phases controlled by the master (e.g., IC1) are turned on earlier than the phases controlled by the slave (e.g., IC2).

It should be noted that the method of setting master/slave shown in FIG. 1 is merely an example, which should not unduly limit the scope of the claims. One of ordinary skill in the art would recognize many variations, alternatives, and modifications. For example, the master/slave setting of the first controller IC1 and the second controller IC2 can be obtained through suitable internal configurations.

In each controller IC, the first phase (e.g., power stage 110 controlled by IC1 or power stage 130 controlled by IC2) is a master phase. The second phase (e.g., power stage 120 controlled by IC1 or power stage 140 controlled by IC2) is a slave phase. In operation, the mater phase of each controller IC (e.g., power stage 110) is turned on before the corresponding salve phase (e.g., power stage 120). According to the system configuration shown in FIG. 1, the first power stage 110 is turned on first. After the turn-on of the first power stage 110 finishes, the second power stage 120, the third power stage 130 and the fourth power stage 140 are turned on sequentially by their respective control circuits. After the turn-on of the fourth power stage 140 finishes, the controllers IC1 and IC2 repeat the process above (turning on power stage 110-140 sequentially).

Each controller IC has an ENPH12 pin providing an enable signal that determines the phase turn-on sequence within the IC. For example, the rising edge of the ENPH12 input is used to set the PH12LATCH signal and forces the ENPH34 output low. The PH12LATCH signal allows the first phase controlled by the controller IC to be turned on first. After the first phase has been turned off, the PH12LATCH signal allows the second phase controlled by the controller IC to be turned on. At the end of the turn-on of the second phase, the PH12LATCH is reset.

In sum, the PH12LATCH signal is set at the time when the ENPH12 signal transitions from low to high. The PH12LATCH signal remains high until the end of the second phase. Such a control scheme is equivalent of capturing a token by a controller IC and keeping it until the two phases or all the phases within this controller IC have been triggered once sequentially.

Furthermore, after the controller IC captures the token, the token is transferred among different phases controlled by the controller IC in a predetermined manner. For example, the first phase within each controller IC captures the token first. In response to the captured token, the PH1ON signal shown in FIG. 1 is set and the first phase is turned on accordingly. After the turn-on of the first phase finishes, the token is released to the second phase after a first predetermined minimum off time ($T_{OFFMIN1}$). In response to the token transferred from the first phase to the second phase, PH1ON is reset and PH2ON is set, and the first controller IC1 is able to turn on the second phase.

Following the end of the second phase and waiting for a second predetermined minimum off time ($T_{OFFMIN2}$), the token is released to the next IC (e.g., the second controller IC2). In response to this token release, ENPH34 output is set to high while the PH12LATCH and PH2ON signals are both reset at the end of the second phase.

The rising edge of ENPH12 signal is used to capture a token by the first controller IC1. All phases within this IC are allowed to be turned on sequentially in a predetermined manner. In some embodiments, after capturing the token, the first controller IC1 turns on the first phase and then the second phase. After all phases have been triggered within the first controller IC1, the token is passed on to the second controller IC2 by setting the ENPH34 output high in the first controller IC1 which is connected to the ENPH12 input pin of the second controller IC2. Once the second controller IC2 detects its ENPH12 pin going high, it locks the internal signal PH12LOCK and forces ENPH34 output low which is then detected by the first controller IC1 and at this time the second controller IC2 captures the token, which has been released by the first controller IC1.

The token transfer in the second controller IC2 is similar to that in the first controller IC1, and hence is not discussed herein. The token transferring control scheme described above allows a sequential firing of the four phases. The turn-on times of the four phases occur in a round robin fashion. As a result, the four-phase converter 100 can achieve an interleaved operation.

Figure 2:
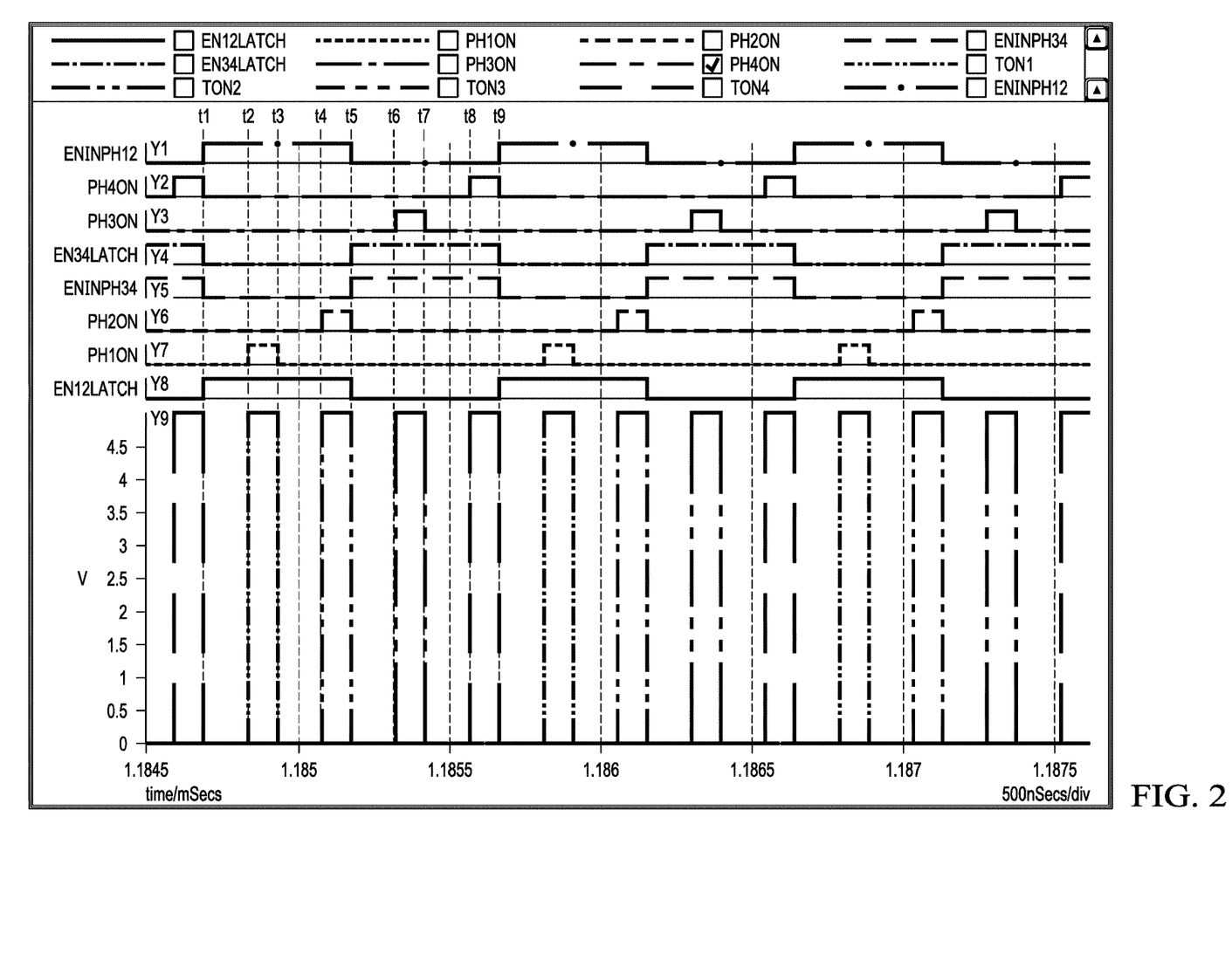
FIG. 2 illustrates various control signals and switching node waveforms of the four-phase converter shown in FIG. 1 in accordance with various embodiments of the present disclosure.

FIG. 2 illustrates various control signals and switching node waveforms of the four-phase converter shown in FIG. 1 in accordance with various embodiments of the present disclosure. The horizontal axis of FIG. 2 represents intervals of time. The unit of the horizontal axis is millisecond. There may be nine vertical axes.

The first vertical axis Y1 represents the ENINPH12 signal (the enable signal of the first controller IC1). The second vertical axis Y2 represents the PH4ON signal (the enable signal of the fourth phase). The third vertical axis Y3 represents the PH3ON signal (the enable signal of the third phase). The fourth vertical axis Y4 represents the EN34LATCH signal (the enable signal of the third and fourth phases). The fifth vertical axis Y5 represents the ENINPH34 signal (the enable signal of the second controller IC2). The sixth vertical axis Y6 represents the PH2ON signal (the enable signal of the second phase). The seventh vertical axis Y7 represents the PH1ON signal (the enable signal of the first phase). The eighth vertical axis Y8 represents the EN12LATCH signal (the enable signal of the first and second phases). The ninth vertical axis Y9 represents the switching node voltages of the four phases.

At t1, the ENINPH12 signal transitions from a logic low to a logic high. In response to the rising edge of the ENINPH12 signal, the first controller IC1 receives a token and the EN12LATCH signal is set as shown in FIG. 2.

The token is passed to the first phase, which allows the first phase to be turned on by its control circuit. At t2, the control circuit of the first phase generates a trigger event. The high-side switch of the first power stage (the power stage of the first phase) is turned on at t2 in response to the trigger event (e.g., Trig1 shown in FIG. 1). The switching node voltage of the first phase shows the high-side switch of the first power stage remains on from t2 to t3. The high-side switch of the first power stage is turned off at t3. At t3, the token is passed from the first phase to the second phase. At t3, the second phase is allowed to be turned on by its control circuit.

At t4, the control circuit of the second phase generates a trigger event. The high-side switch of the second power stage (the power stage of the second phase) is turned on at t4 in response to the trigger event. The switching node voltage of the second phase shows the high-side switch of the second power stage remains on from t4 to t5. The high-side switch of the second power stage is turned off at t5. After both phases controlled by the first controller have been turned off, the token is passed from the first controller IC1 to the second controller IC2 at t5.

At t5, the second controller IC2 receives the token from the first controller IC1. The ENINPH34 signal transitions from a logic low to a logic high. In response to the rising edge of the ENINPH34 signal, the EN34LATCH is set as shown in FIG. 2. At t5, the third phase is allowed to be turned on by its control circuit.

At t6, the control circuit of the third phase generates a trigger event. The high-side switch of the third power stage (the power stage of the third phase) is turned on at t6 in response to the trigger event. The switching node voltage of the third phase shows the high-side switch of the third power stage remains on from t6 to t7. The high-side switch of the third power stage is turned off at t7. At t7, the token is passed from the third phase to the fourth phase, and the fourth phase is allowed to be turned on by its control circuit.

At t8, the control circuit of the second phase generates a trigger event. The high-side switch of the fourth power stage (the power stage of the fourth phase) is turned on at t8 in response to the trigger event. The switching node voltage of the fourth phase shows the high-side switch of the fourth power stage remains on from t8 to t9. The high-side switch of the fourth power stage is turned off at t9. After both phases controlled by the second controller have been turned off, the token is passed back to the first controller IC1 from the second controller IC2 at t9.

As shown in FIG. 2, after a trigger event, the high-side switch of a phase is turned on and remains on until the control loop of the phase (e.g., on timer) turns off the high-side switch. After the high-side switch has been turned off, the token is released and handed to the next phase after a predetermined minimum off time $T_{OFFMIN}$. In some embodiments, the predetermined minimum off time $T_{OFFMIN}$ can be zero. The next phase receives token and is then allowed its high-side switch to be turned on.

A phase is enabled after it has captured the token (PHxON/PHxEN=1). After the phase is enabled, the high-side switch of the phase is turned on after a triggering event occurs (TRIGx=1). In some embodiments, the trigger event is set by a comparator of the phase. More particularly, the comparator compares an output voltage or a feedback signal to a predetermined reference. In alternative embodiments, the triggering event is set by filtering the switching node signal to derive the equivalent pseudo-inductor-current information. The filtered signal is then ac-coupled or high-pass filtered and then summed to the feedback signal and compared against a reference voltage to set the trigger time for each phase.

In some embodiments, each phase can have its independent trigger event by detecting its phase current or switching node information and adding this to the feedback/output voltage and then comparing it against a fixed error voltage from the master phase. Alternatively, the combination of the phase current and the feedback voltage is compared with a fixed but common reference voltage. Comparing against a single error or reference voltage from the master phase ensures better accuracy for output voltage regulation as well as phase current balancing among all the phases.

Referring back to FIG. 1, the error voltage that is common to all the phases is the output signal from the master phase and named VCOMP1$_{OUT}$ in FIG. 1. The control loop of the first phase generates the error voltage at its analog control loop and sends this output via the VCOMP1$_{OUT}$ pin to the other phases. In other words, the VCOMP1$_{OUT}$ signal is shared by all the other phases that are configured to be part of the multiphase power converter shown in FIG. 1.

From the waveforms shown in FIG. 2, a sequential round robin operation of the four phases has been achieved. One advantageous feature of having the token-passing control scheme shown in FIG. 2 is the interleaved operation of the four phases helps to fully realize the advantages of having a multiphase power converter. The advantages include lower switching losses, higher efficiency, lower output ripple voltage, better transient performance and lower ripple current rating requirements for the input capacitor and the like.

Figure 3:
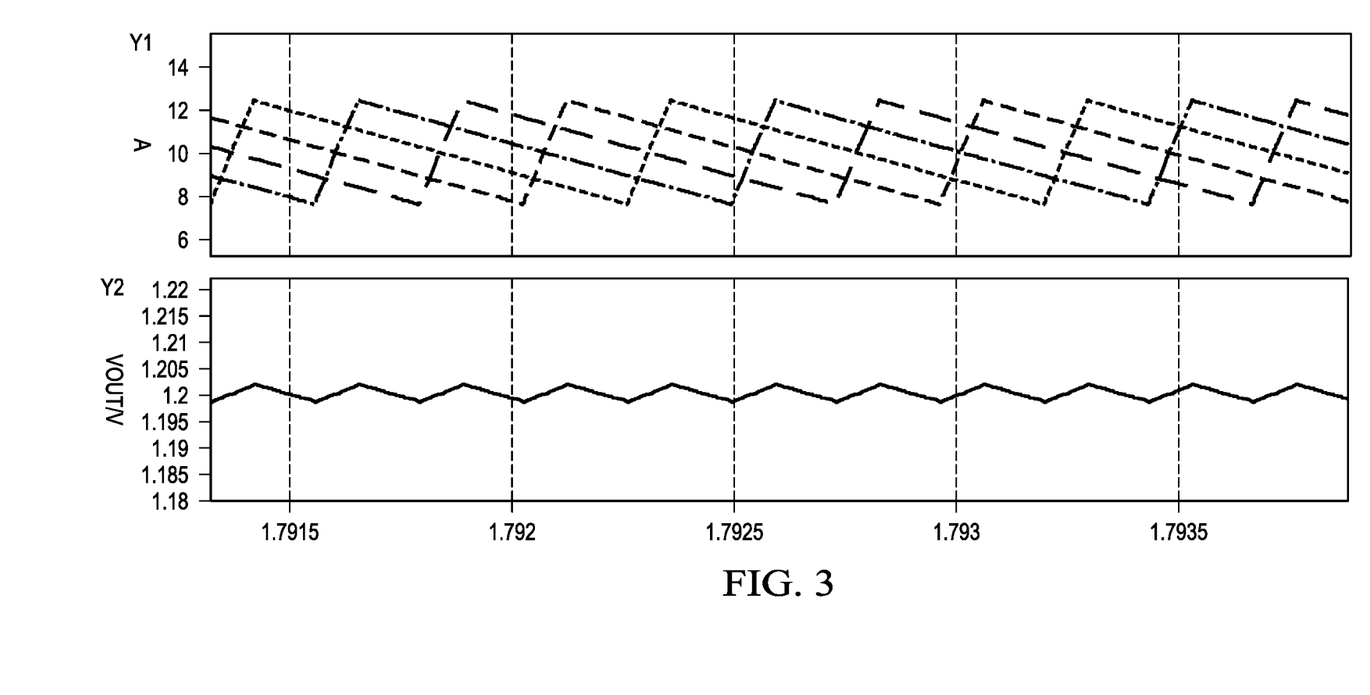
FIG. 3 illustrates waveforms of the four-phase converter shown in FIG. 1 in accordance with various embodiments of the present disclosure.

FIG. 3 illustrates waveforms of the four-phase converter shown in FIG. 1 in accordance with various embodiments of the present disclosure. The horizontal axis of FIG. 3 represents intervals of time. The unit of the horizontal axis is millisecond. There may be two vertical axes. The first vertical axis Y1 represents the currents flowing through the inductors of the four phases. The second vertical axis Y2 represents the output voltage of the four-phase converter.

FIG. 3 shows the load current of the four-phase converter is split across the four phases uniformly. In addition, the interleaved operation results in output ripple current reduction. In particular, by phase shifting the turn-on time instances of the four phases shown in FIG. 2, the inductor ripple currents of the power stages tend to cancel each other out. The cancellation of inductor ripple currents results in a smaller ripple current flowing into the output capacitors. This means interleaved operation of the multiphase converter results in a reduced ripple voltage across the output capacitor compared to a single-phase converter.

Figure 4:
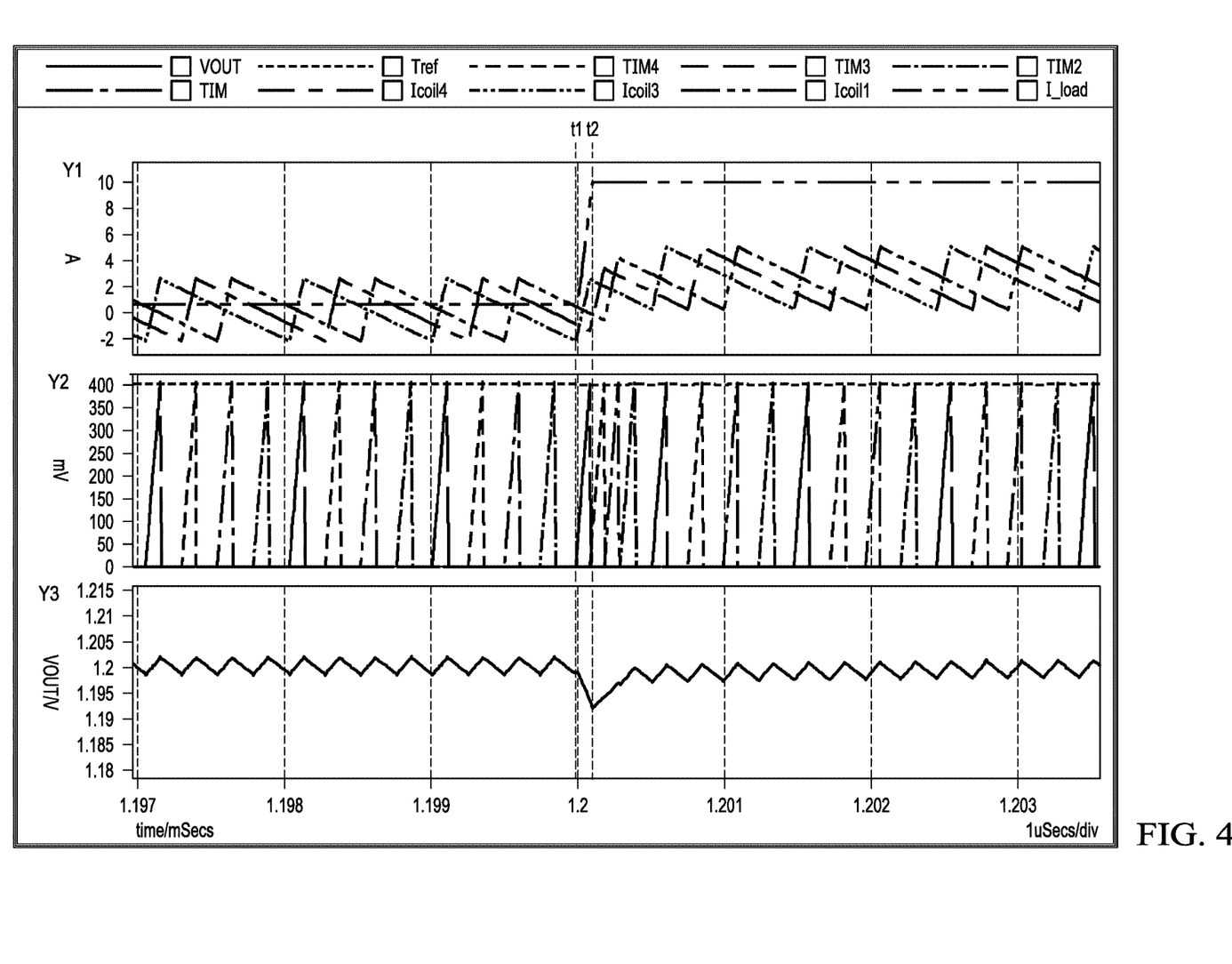
FIG. 4 illustrates various transient response waveforms of the four-phase converter shown in FIG. 1 in accordance with various embodiments of the present disclosure.

FIG. 4 illustrates various transient response waveforms of the four-phase converter shown in FIG. 1 in accordance with various embodiments of the present disclosure. The horizontal axis of FIG. 4 represents intervals of time. The unit of the horizontal axis is millisecond.

There may be three vertical axes. The first vertical axis Y1 represents the load current of the four-phase converter and the currents flowing through the inductors of the four phases. The second vertical axis Y2 represents the currents flowing through the high-side switches of the four phases. The third vertical axis Y3 represents the output voltage of the four-phase converter.

From t1 to t2, the load current the four-phase converter jumps from about 1 A to about 10 A. In response to the load transient, the output voltage the four-phase converter drops about 7 mV as shown in FIG. 4. The current waveforms show the four power stages are turned on sequentially. In other words, the four phases operate in an interleaved manner, thereby reducing the ripple and improving the transient response performance of the four-phase power converter.

Figure 5A:
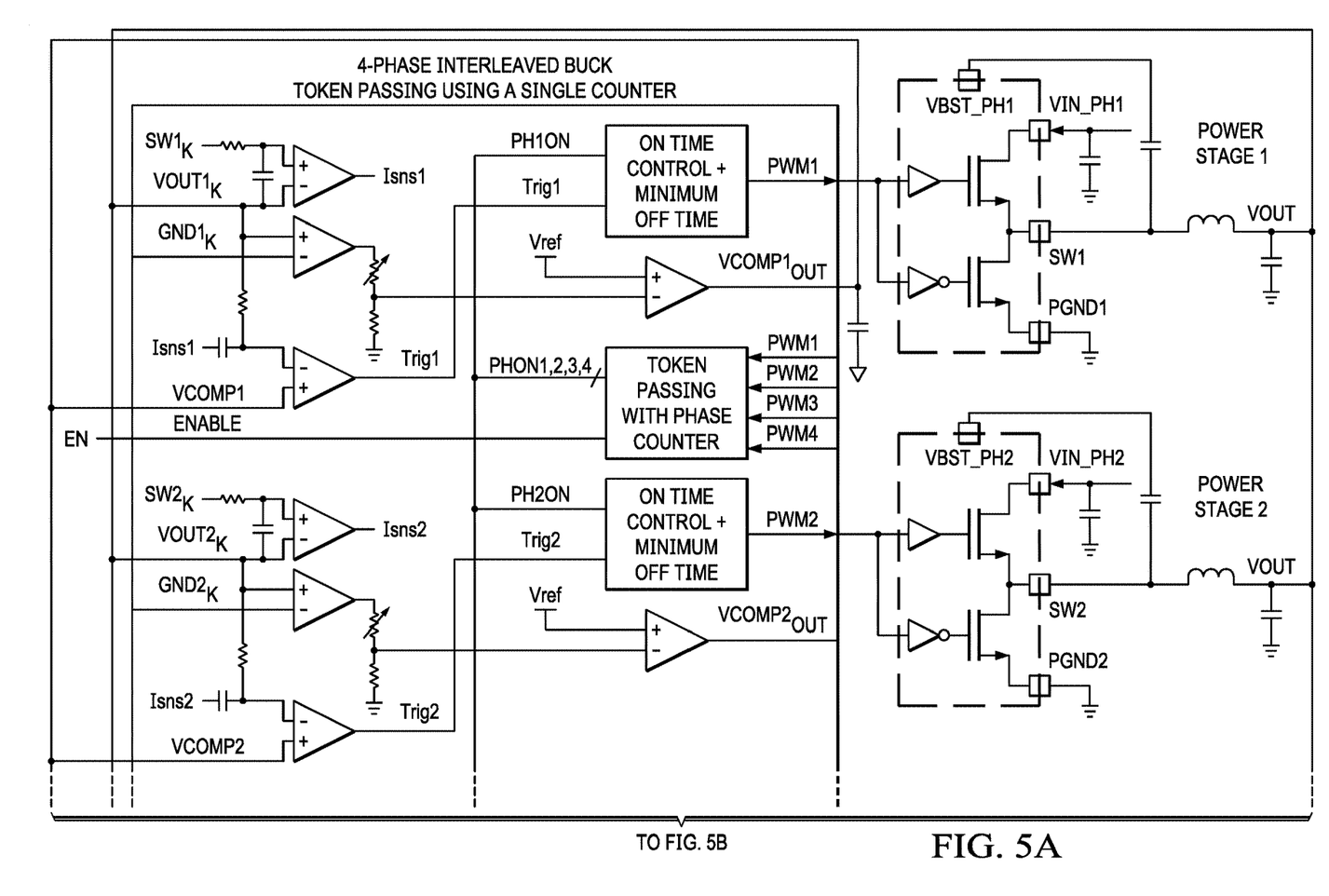
FIG. 5 illustrates a schematic diagram of a second implementation of a four-phase converter employing a constant on-time control scheme in accordance with various embodiments of the present disclosure and FIG. 5 includes FIG. 5A and FIG. 5B, which are collectively referred to as FIG. 5.
Figure 5B:
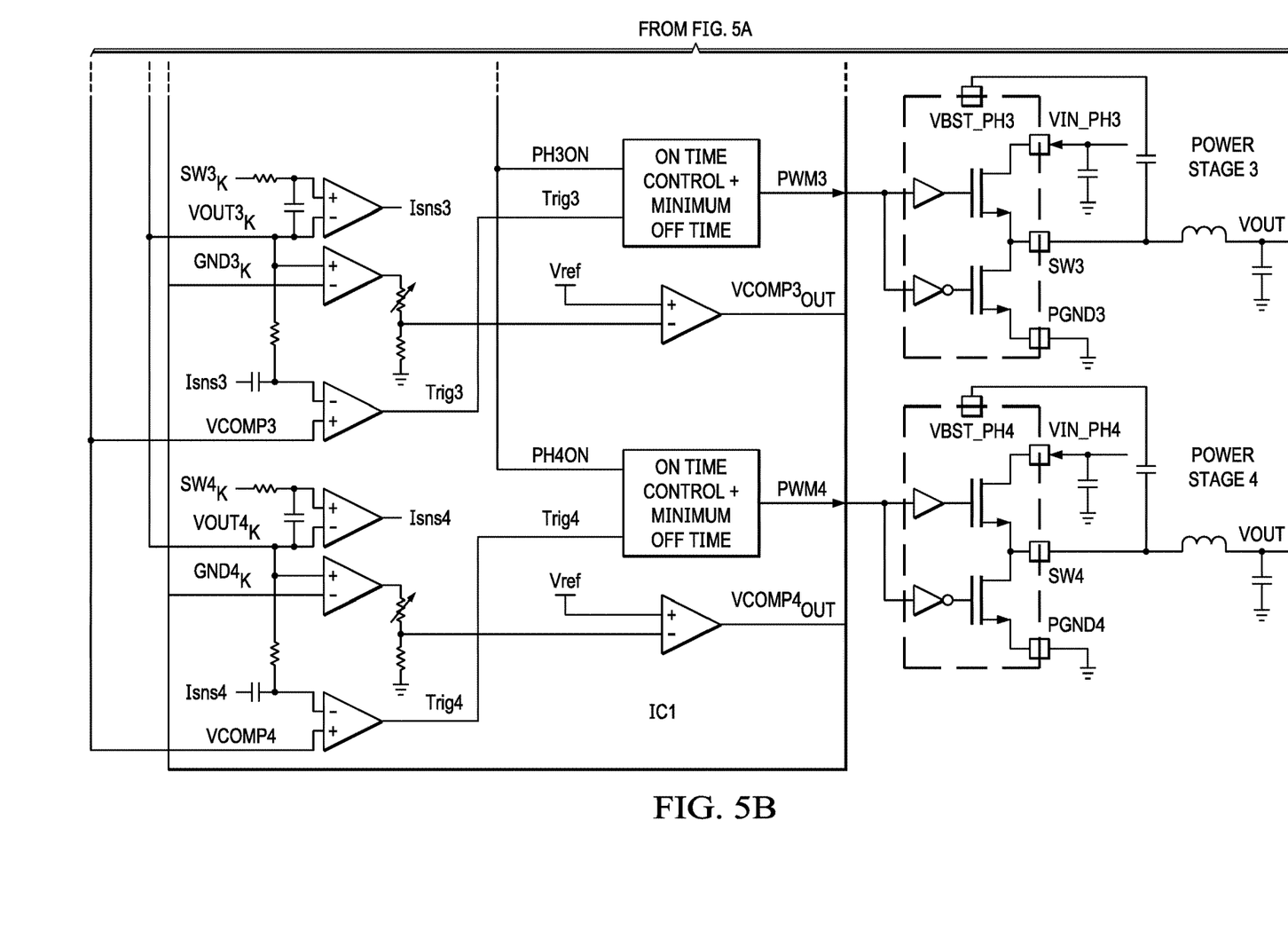

FIG. 5 illustrates a schematic diagram of a second implementation of a four-phase converter employing a constant on-time control scheme in accordance with various embodiments of the present disclosure. FIG. 5 includes FIG. 5A and FIG. 5B. Throughout the description, FIG. 5A and FIG. 5B are collectively referred to as FIG. 5.

The four-phase converter shown in FIG. 5 is similar to that shown in FIG. 1 except that the control circuits of the four phases are implemented on a single controller IC1. Furthermore, the control circuits shown in FIG. 5 do not have a token transferred between two ICs. A simple counter is used to fulfill the token transferring control scheme discussed above with respect to FIGS. 1-2.

FIG. 5 shows the controller IC1 comprises a token passing counter and four on-time and minimum off-time control units. The token passing counter receives the PWM signals of the four phases (PWM1, PWM2, PWM3 and PWM4) and generates tokens (PH1ON, PH2ON, PH3ON and PH4ON) for the four phases respectively.

The four on-time and minimum off-time control units are employed to generate PWM signals (PWM1, PWM2, PWM3 and PWM4) for the four phases respectively. The operation principle of the four on-time and minimum off-time control units is similar to that shown in FIG. 1, and hence is not discussed in detail herein.

Each phase shown in FIG. 5 comprises a feedback control unit. For brevity, only the feedback control unit of the first phase (power stage 1) is described below in detail. As shown in FIG. 5, the feedback control unit of the first phase comprises a current sense amplifier to generate a current sense signal Isns1. The current sense signal Isns1 is proportional to the current flowing through the inductor of the first phase. As shown in FIG. 5, the inputs of the current sense amplifier are connected to the switching node $SW1_K$ and the output voltage $VOUT1_K$ respectively.

The feedback control unit further comprises three comparators. A first comparator is used to compare $VOUT1_K$ with a ground signal $GND1_K$. A second comparator is used to compare an output signal of the first comparator and a reference signal. The second comparator generates a control signal VCOMP1. As shown in FIG. 5, VCOMP1 is shared by the four phases. A third comparator is used to compare VCOMP1 with a signal combining the current sense signal Isns1 and the output voltage $VOUT1_K$. The output of the third comparator functions as a trigger signal Trig1. The trigger signal Trig1 is used to turn on the high-side switch of the first phase after the token has been given to the first phase.

In some embodiments, after the counter starts, the counter gives a token to the first phase (power stage 1). After the first phase receives the token, a trigger event generated by its control circuit turns on the high-side switch of the first phase. After the high-side switch of the first phase has been turned off, the counter hands the token from the first phase to the second phase (power stage 2).

In sum, the counter hands the token in a round robin fashion from the first phase to the fourth phase. At the end of the fourth phase, the counter repeats this process again.

It should be noted when a phase has received the token, a trigger event in that phase is allowed and the high-side switch of this phase is turned on in response to the trigger event. On the other hand, any triggering events that occur at a time when the token is not in possession are ignored.

In a constant on-time or an active on-time architecture (where the on-time is proportional to Vout/Vin), a phase is turned on for a fixed on-time whenever a triggering event occurs and the token is possessed by this phase. The triggering event in FIG. 5 can also be set by a comparator that compares an error voltage VCOMP/VERR against the sum of the filtered ripple signal obtained from filtering the switching node signal in each phase and then summing this to the feedback signal (or output voltage directly without dividing down).

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   providing a power converter comprising a plurality of power phases, wherein:
   each power phase comprises a power stage and a corresponding control circuit;
   outputs of the plurality of power phases are connected together; and
   each power stage is controlled by a constant-on time and minimum off-time control scheme using a pulse-width modulated signal generated by the corresponding control circuit in response to a trigger signal; and
   configuring the plurality of power phases to operate in an interleaved manner by passing a token sequentially among the plurality of power phases, wherein the token represents an enable function for allowing a high-side switch of a power phase possessing the token to be turned on and the token is passed to a next power phase after a minimum off-time of the high-side switch.

2. The method of claim 1, wherein:
   the plurality of power phases are controlled by a first controller and a second controller; and
   the first controller is configured as a master and the second controller is configured as a slave.

3. The method of claim 2, wherein:
   the power phases controlled by the master are turned on earlier than the power phases controlled by the slave.

4. The method of claim 2, wherein:
   the power phases controlled by the master are turned on sequentially; and
   the power phases controlled by the slave are turned on sequentially.

5. The method of claim 2, wherein:
   the token is transferred among different phases controlled by the master in a predetermined manner; and
   the token is transferred among different phases controlled by the slave in a predetermined manner.

6. The method of claim 5, wherein:
   the token is released from the master to the slave when a last power phase controlled by the master finishes.

7. The method of claim 1, wherein:
   each power phase comprises a step-down power converter.

8. The method of claim 1, wherein:
   the plurality of power phases are controlled by a single controller; and
   the token is transferred between different phases by a counter.

9. The method of claim 8, wherein:
   the counter is configured to hand the token in a round robin fashion from a first power phase to a last power phase and repeat this process again after the last power phase finishes.

10. A method comprising:
    configuring a plurality of power phases of a power converter to operate in an interleaved manner by passing a token sequentially among the plurality of power phases;
    generating a first pulse-width modulated signal to turn on a first power phase after the first power phase possesses the token and receives a trigger signal from a control circuit of the first power phase;
    after a pre-determined minimum off-time of the first power phase, passing the token to a second power phase to enable the second power phase;

after a pre-determined minimum off-time of the second power phase, passing the token sequentially until a last power phase of the plurality of power phases possesses the token; and forwarding the token to the first power phase after the last power phase finishes.

11. The method of claim 10, wherein:

each power phase comprises a power stage and a corresponding control circuit; and outputs of the plurality of power phases are connected together.

12. The method of claim 10, wherein:

the token represents an enable function for allowing a high-side switch of a power phase possessing the token to be turned on.

13. The method of claim 10, wherein each power phase comprises a constant on-time power converter comprising:

a first switch and a second switch connected in series between an input power source and ground; and an inductor connected between a common node of the first switch and the second switch, and an output of the constant on-time power converter.

14. The method of claim 10, wherein:

the plurality of power phases are controlled by a first controller and a second controller;

the first controller is configured as a master and the second controller is configured as a slave;

the power phases controlled by the master are turned on earlier than the power phases controlled by the slave; and the token is released from the master to the slave when a last power phase controlled by the master finishes.

15. The method of claim 10, wherein:

the plurality of power phases are controlled by a single controller;

the token is transferred between different phases by a counter; and the counter is configured to hand the token in a round robin fashion from the first power phase to the last power phase, and repeats this process again after the last power phase finishes.

16. A system comprising:

a plurality of power phases connected between an input power source and an output terminal, wherein each power phase comprises a constant on-time and minimum off-time power converter; and a controller configured to generate constant on-time and minimum off-time gate drive signals for the plurality of power phases in response to a trigger signal, wherein the plurality of power phases are configured to operate in an interleaved manner by passing a token sequentially among the plurality of power phases, wherein:

the token is generated and passed among the plurality of power phases by the controller;

the token represents an enable function for allowing a power phase possessing the token to be turned on; and the token is passed to a next power phase after a pre-determined minimum off-time of the power phase possessing the token.

17. The system of claim 16, wherein:

the controller comprises a first control unit and a second control unit;

a plurality of first power phases is controlled by the first control unit and a plurality of second power phases is controlled by the second control unit; and the first control unit is configured as a master and the second control unit is configured as a slave.

18. The system of claim 17, wherein:

the first power phases are turned on earlier than the second power phases.

19. The system of claim 16, wherein:

the controller comprises a counter; and the counter is configured to hand the token in a round robin fashion from a first power phase to a last power phase, and repeats this process again after the last power phase finishes.

20. The system of claim 16, wherein the constant on-time and minimum off-time power converter comprises:

a first switch and a second switch connected in series between an input power source and ground; and an inductor connected between a common node of the first switch and the second switch, and an output capacitor.

* * * * *